United States Patent [19]

Su

[11] Patent Number: 4,824,912

[45] Date of Patent: Apr. 25, 1989

[54] TERBLENDS AND FILMS OF LLDPE, LMW-HDPE AND HMW-HDPE

[75] Inventor: Tien-Kuei Su, Belle Mead, N.J.

[73] Assignee: Mobil Oil Corporation, New York, N.Y.

[21] Appl. No.: 91,580

[22] Filed: Aug. 31, 1987

[51] Int. Cl.$^4$ .................. C08L 23/06; C08L 23/08; C08L 23/18
[52] U.S. Cl. .................................................. 525/240
[58] Field of Search ........................................ 525/240

[56] References Cited

U.S. PATENT DOCUMENTS

| | | | |
|---|---|---|---|
| 3,381,060 | 4/1968 | Peacolk et al. ............... | 525/240 |
| 4,339,507 | 7/1982 | Kurtz et al. . | |
| 4,429,079 | 1/1984 | Shibata et al. . | |
| 4,438,238 | 3/1984 | Fukushima et al. . | |
| 4,705,829 | 11/1987 | Kwack et al. ............... | 525/240 |

FOREIGN PATENT DOCUMENTS 2526803A 11/1983 France .................. 525/240

OTHER PUBLICATIONS

The Encyclopedia of Chemical Technology, Kirk-Othmer, Third Edition, John Wiley & Sons, N.Y., 1981, vol. 16, pp. 385-388.

*Primary Examiner*—Carman J. Seccuro
*Attorney, Agent, or Firm*—Alexander J. McKillop; Charles J. Speciale; Michael J. Mlotkowski

[57] ABSTRACT

Terblends of a major proportion of LLDPE (linear low density polyethylene) and minor amounts of LMW-HDPE (high density polyethylene of low molecular weight) and of HMW-HDPE (high density polyethylene of high molecular weight) give blends which are processable at higher rates, give lower extruder backpressure and result in films generally superior to those made from LLDPE alone.

20 Claims, No Drawings

TERBLENDS AND FILMS OF LLDPE, LMW-HDPE AND HMW-HDPE

BACKGROUND OF THE INVENTION

It is well known that LLDPE (linear low density polyethylene) such as copolymers of ethylene and hexene generally produce films of superior properties over high pressure highly branched low density polyethylenes (LDPE). LLDPE films exhibit higher tensile strength, outstanding puncture resistance and enhanced impact strength. However, the extrudability of LLDPE resins is poor mainly because of their high shear viscosity. Due to the absence of long chain branching in LLDPE, its shear viscosity exhibits less shear thinning than branched LDPE. This non-Newtonian rheological behaviour brings about extrusion difficulties by increasing extrusion head pressure resulting in high motor amperage and high torque which limits the output under a given set of extrusion conditions compared to that possible with prior art LDPE resins.

Furthermore, the extrusion problem is frequently accompanied by the appearance of surface irregularities on the produced film. Surface irregularities or more generally, "melt fracture" occur over a range of shear rate depending on the molecular characteristics of the polymer. These are characterized by closely spaced circumferential ridges along the extrudate when extruded through a capillary die. In a more severe form it resembles what is generally known as "sharkskin." The onset of melt fracture is believed to occur at or above a critical shear stress although the concept is yet to be fully understood.

In the past many attempts were made to alleviate the extrusion problems encountered with LLDPE. For example, blends of linear low density polyethylenes with LDPE (branched high pressure low density polyethylene) are known. The use of various kinds of processing aids such as low molecular weight hydrocarbons, fatty amides or bis-amides, fluoroelastomers and certain silicon polymers is also known.

In a copending application Ser. No. 810,117 filed Dec. 18, 1985, now abandoned, in which I am a co-inventor and which is incorporated herein by reference various blends of LLDPE with high MI resins including LMW-HDPE are described. In accordance with this invention further improvements in blends of LLDPE and LMW-HDPE are obtained by adding HMW-HDPE.

SUMMARY OF THE INVENTION

Blends of a major proportion of LLDPE and minor proportions of each of LMW-HDPE and HMW-HDPE exhibit lower extrusion head pressure and lower extruder torque than LLDPE, and can be extruded into high quality films. The use of both LMW and HMW-HDPE results in films of better overall quality than the use of LMW-HDPE alone.

DETAILED DESCRIPTION OF THE INVENTION

The blends of this invention which exhibit improved extrusion characteristics such as reduced back pressure, lower power consumption and higher melt strength extrudate generally comprise 50–98 weight percent LLDPE, 1–25 weight percent LMW-HDPE and 1–25 weight percent HMW-HDPE. Preferably, the LLDPE comprises 70–95 weight percent, the LMW-HDPE comprises 5–20 weight percent, and the HMW-HDPE comprises 1–10 weight percent. The LMW-HDPE is usually present in amounts greater than the HMW-HDPE.

The LLDPE generally contains up to about 10 weight percent of polymerized higher alpha olefin and has a density between about 0.9 to about 0.94, preferably less that 0.930. The melt index (MI) is usually from about 0.4 to about 4 or more and preferably from about 0.6 to about 2. LLDPE copolymers of ethylene and hexene are particularly preferred.

The HDPE resins used advantageously have a density of 0.94 or higher, preferably 0.95 or higher. They can be homopolymers or copolymers of ethylene and a small amount of a higher olefin.

The MI (melt index) of the low molecular weight component LMW-HDPE is usually greater than 10, preferably greater that 25. LMW-HDPE resins having an MI of about 50 have been found to be quite suitable.

The high molecular weight high density polyethylene HMW-HDPE generally will have an MI of less than 1 and preferably less than 0.5. This HMW-HDPE component is essential to the composition because it is responsible for the good melt strength of the composition during extrusion and contributes to improving the MD tear and other film properties of the binary blend of LLDPE and LMW-HDPE.

The ternary blends of this invention can be prepared in any way known to those skilled in the art. Thus, a physical mixture of the three polymers in powder or in pellet form can be blended into a uniform composition in a Banbury mixer or by milling the composition on calendar rolls using temperatures above the melting point of the higher melting component. In a preferred embodiment, a rough mixture of the three polymers is put through a melt extruder containing a mixing extrusion screw or a mixing section on the extrusion screw. The resins may also be in the form of granules and may be blended as either granules or pellets or mixtures thereof. Other means of obtaining a homogeneous blend will be apparent to those skilled in the art.

As in other polyolefin compositions, stabilizers, antioxidants, plasticizers, pigments, fillers and similar additives can be incorporated into the blends of the present invention. The composition of the present invention can be fabricated into film, fiber, sheeting, rod, tubing, pipe and a variety of molded objects, using methods generally employed in the fabrication of polyolefins. In particular, the compositions of the present invention are outstanding as film resins.

The invention is illustrated by the following non-limiting examples in which all parts are by weight unless otherwise specified.

EXAMPLE 1

A blend of 88 weight percent LLDPE, 8 weight percent LMW-HDPE and 4 weight percent HMW-HDPE was extruded into film using a 2½ inch Sterlex extruder with a 6 inch die. The improvements in extrudability (lower back pressure etc.) and film properties are apparent by comparison with the data reported in Table 1 when the same LLDPE was extruded alone. The film index is an internally defined composite of film characteristics in which the higher value indicates higher overall quality.

The LLDPE used was Exxon 3001 (MI=1.0, Density=0.9180), the LMW-HDPE was Mobil HMA-019 (MI=50.0, Density=0.9540), and the HMW-HDPE was DuPont L5005 (MI=0.05, Density=0.9500).

TABLE 1

| RESIN | LLDPE CONTROL | BLEND EXAMPLE 1 |
|---|---|---|
| Output Rate, lb./hr. | 120 | 120 |
| Screw Speed, rpm | 50 | 52 |
| Motor Current, Amperage | 60 | 53 |
| Melt Temperature, °F. | 425 | 415 |
| Back Pressure, psi | 5500 | 5000 |
| Modulus, psi × $10^{-3}$ | | |
| MD | 28.8 | 37.0 |
| TD | 32.9 | 42.4 |
| Yield, psi × $10^{-3}$ | | |
| MD | 1.45 | 1.68 |
| TD | 1.49 | 1.90 |
| Ultimate, psi × $10^{-3}$ | | |
| MD | 6.31 | 6.38 |
| TD | 5.58 | 8.17 |
| Toughness, psi × $10^{-4}$ | | |
|  | 1.61 | 1.80 |
| TD | 1.83 | 2.07 |
| Tear, g/mil | | |
| MD | 461 | 390 |
| TD | 908 | 980 |
| Elongation, % | | |
| MD | 620 | 638 |
| TD | 775 | 817 |
| Film Index | 165 | 182 |

EXAMPLE 2

The blend of the same resins Example 1 in which the proportions of LLDPE/LMW-HPE/HMW-LLDPE was 88/8/4, was extruded into a film using a ¾ inch Brabender extruder with a 1 inch die. The processing parameters and several film characteristics are reported in Table 2.

TABLE 2

| RESIN | LLDPE CONTROL | BLEND EXAMPLE 2 |
|---|---|---|
| Output Rate, lb./hr. | 2.4 | 2.4 |
| Screw Speed, rpm | 48 | 48 |
| Back Pressure, psi | 3020 | 2810 |
| Modulus, psi × $10^{-3}$ | | |
| MD | 32.2 | 38.2 |
| TD | 37.1 | 47.5 |
| Yield, psi × $10^{-3}$ | | |
| MD | 1.52 | 1.73 |
| TD | 1.57 | 1.73 |
| Tear, g/mil | | |
| MD | 473 | 520 |
| TD | 946 | 808 |

I claim:

1. A composition comprising a blend of a major proportion of LLDPE (linear low density polyethylene) and a minor proportion of each of two HDPE (high density polyethylene) resins one of which is LMW-HDPE having a MI (melt index) of greater than 10 and the other being HMW-HDPE having a melt index of less than 1.

2. The composition of claim 1 which the LLDPE comprises 50–98 weight LLDPE, 1–25 weight percent LMW-HDPE and 1–25 weight percent HMW-HDPE.

3. The composition of claim 1 which comprises 70–95 weight percent LLDPE, 5–20 weight percent LMW-HDPE and 1–10 weight percent HMW-HDPE.

4. The composition of claim 1 in which said LLDPE has a density of less than 0.93 and a MI of 2 or less; said LMW-HDPE has a density greater than 0.94 and a MI of at least 25; and said HMW-HDPE has a density greater than 0.94 and a MI of less than 0.5.

5. The composition of claim 2 in which said LLDPE has a density of less than 0.93 and a MI of 2 or less; said LMW-HDPE has a density greater than 0.94 and a MI of at least 25; and said HMW-HDPE has a density greater than 0.94 and a MI of less than 0.5.

6. The composition of claim 3 in which said LLDPE has a density of less than 0.93 and a MI of 2 or less; said LMW-HDPE has a density greater than 0.94 and a MI of at least 25; and said HMW-HDPE has a density greater than 0.94 and a MI of less than 0.5.

7. The composition of claim 1 in which said LLDPE is a copolymer of ethylene and hexene.

8. The composition of claim 2 in which said LLDPE is a copolymer of ethylene and hexene.

9. The composition of claim 3 in which said LLDPE is a copolymer of ethylene and hexene.

10. The composition of claim 4 in which said LLDPE is a copolymer of ethylene and hexene.

11. The composition of claim 1 in the form of a film.
12. The composition of claim 2 in the form of a film.
13. The composition of claim 3 in the form of a film.
14. The composition of claim 4 in the form of a film.
15. The composition of claim 5 in the form of a film.
16. The composition of claim 6 in the form of a film.
17. The composition of claim 7 in the form of a film.
18. The composition of claim 8 in the form of a film.
19. The composition of claim 9 in the form of a film.
20. The composition of claim 10 in the form of a film.